A. J. BROWN.
CENTRIFUGALLY OPERATED SWITCH.
APPLICATION FILED NOV. 13, 1908.

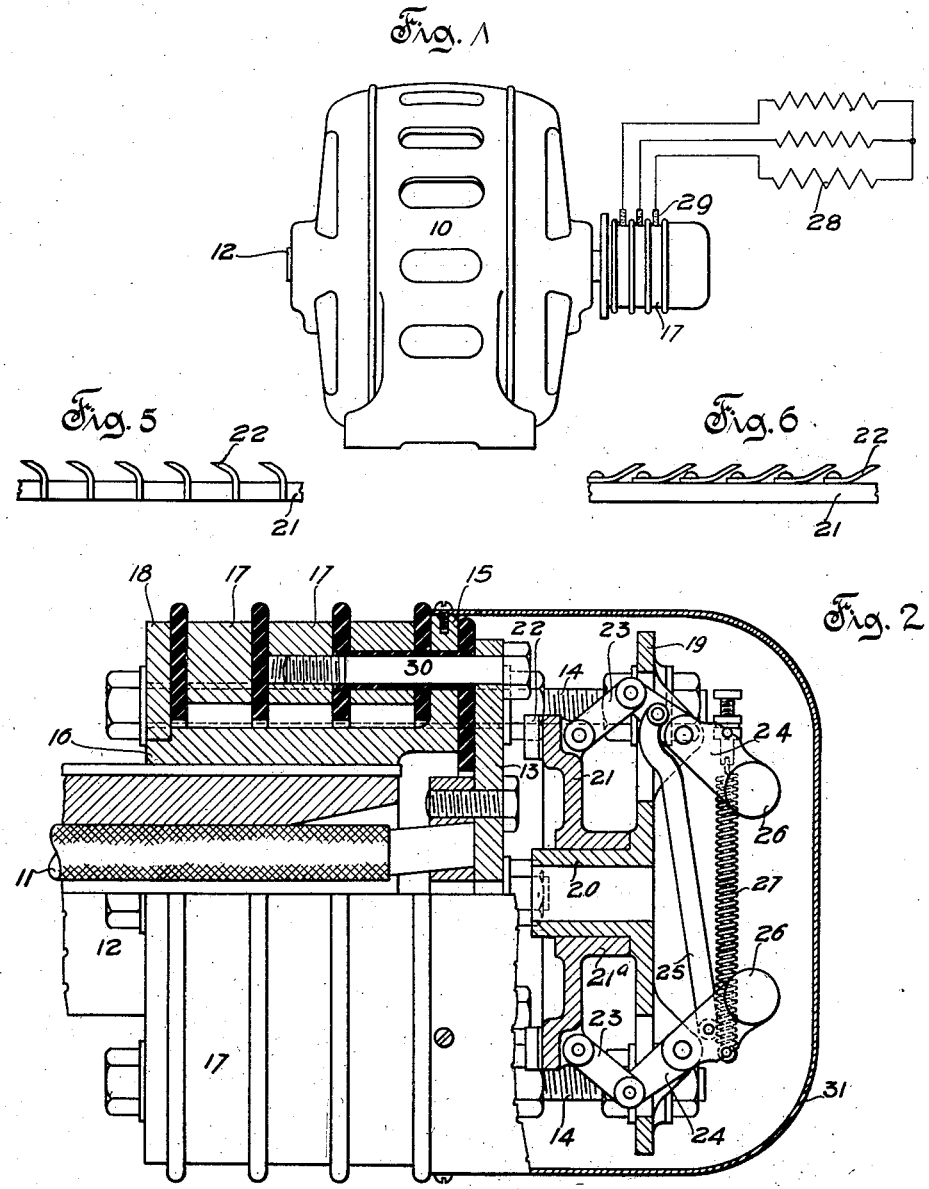

1,101,994.

Patented June 30, 1914.
2 SHEETS—SHEET 2.

Witnesses:
Rob. E. Stoll.
Chas. L. Byron.

Inventor:
Arthur J. Brown.
By Chas. E. Lord
Attorney

UNITED STATES PATENT OFFICE.

ARTHUR J. BROWN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

CENTRIFUGALLY-OPERATED SWITCH.

1,101,994.      Specification of Letters Patent.      Patented June 30, 1914.

Application filed November 13, 1908. Serial No. 462,453.

*To all whom it may concern:*

Be it known that I, ARTHUR J. BROWN, a citizen of the United States, residing at Milwaukee, in the county of Milwaukee and State of Wisconsin, have invented certain new and useful Improvements in Centrifugally-Operated Switches, of which the following is a full, clear, and exact specification.

My invention relates to short-circuiting devices for induction motors of the wound-rotor type.

In order to obtain a large starting torque with induction motors, it is customary to insert resistance in circuit with the rotor windings of the motor during starting, and to cut out or short-circuit said resistance as the motor approaches full speed. When this extra resistance is located outside of the rotor body, it is connected to the rotor windings through slip rings, and is usually short-circuited at the proper time by inter-connecting the slip rings.

My present invention is an improvement on devices of this kind.

The specific novel features of my invention will appear from the specification and drawings and will be particularly pointed out in the claims.

Figure 4:
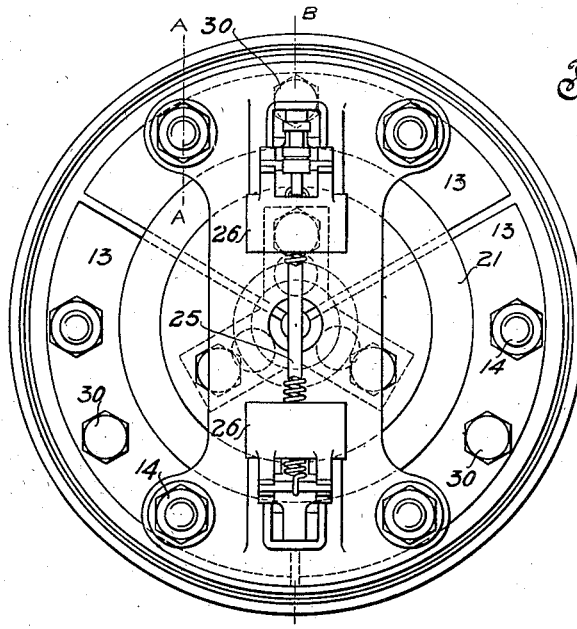
Figure 3:
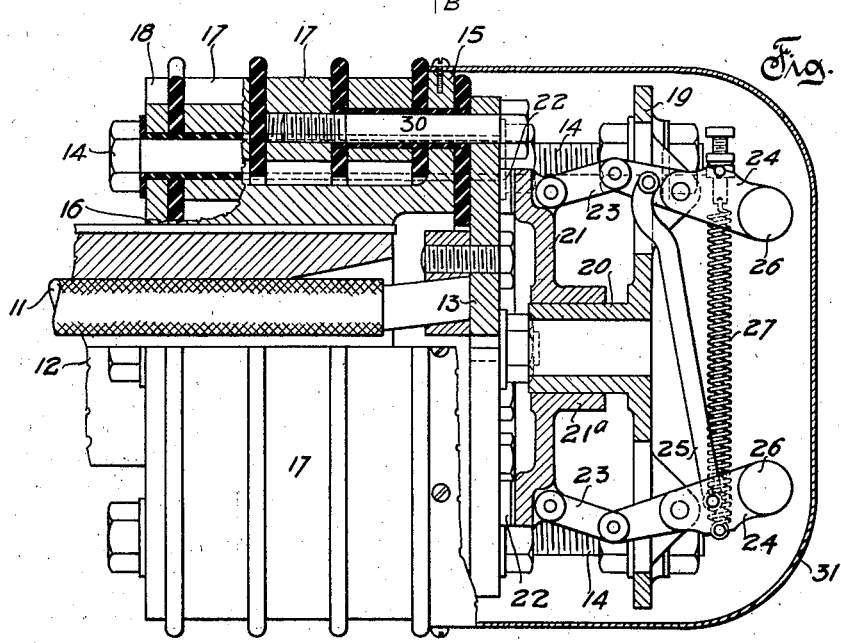

Figure 1 is an elevation of an induction motor to which my device is applied, and shows the circuits diagrammatically; Fig. 2 is a partial longitudinal section through the slip rings and short-circuiting device, showing the latter in its open position; Fig. 3 is a somewhat similar view, taken partly on each of the lines A—A and B—B of Fig. 4, and showing the short-circuiting device in its closed position; Fig. 4 is an end elevation of the short-circuiting device with the cover removed and some parts broken away; and Figs. 5 and 6 show two arrangements of the spring contacts of the short-circuiting device.

The induction motor 10 of the wound-rotor type may be of any desired construction. It is here shown as a three phase motor. The three leads 11 from the rotor windings extend through the hollow shaft 12 to the three sector plates 13, to which they are electrically connected. Bolts 14 clamp the sector plates 13 to the plate 15 of the sleeve 16, which is fixed on the shaft 12, and also clamp the collector rings 17 between the plate 15 and another plate 18. The sector plates 13 and the rings 17 are all insulated from each other and from the plates 15 and 18. Each of the sector plates 13 is connected to one of the collector rings 17, by means of a screw 30.

Supported on some of the bolts 14, but insulated therefrom, is a disk 19 having a hub 20, slidable on which hub is a ring 21 carrying a number of spring contacts 22. This ring 21 has a projection 21ª which is adapted to telescope with the hub 20. Two ways of mounting these contacts are shown in Figs. 5 and 6 respectively. Links 23 connect the ring 21 to the outer ends of arms 24 pivoted on the disk 19. The two arms 24 are connected by a rod 25, and on their outer ends carry weights 26. The whole short-circuiting device is inclosed in a hood 31, fastened to the plate 15.

When the motor is at rest, the parts are held in the position shown in Fig. 2 by the adjustable spring 27. At this time the resistance 28 is connected to the rotor windings through the brushes 29 and slip rings 17. When the primary circuit of the motor 10 is completed, the motor starts with a comparatively large starting torque on account of the resistance of its secondary circuit. As the motor approaches running speed, the weights 26 are forced outward by the action of centrifugal force and against that of the spring 27 to bring the brushes 22 into engagement with the sector plates 13. This inter-connects the sector plates 13 or the slip rings 17, and short-circuits the resistance 28, thus reducing the resistance of the secondary circuit of the motor and giving it a high running efficiency.

Many modifications may be made in the precise arrangement here shown and described, and all such which do not depart from the spirit and scope of my invention I aim to cover in the following claims.

What I claim as new is:

1. A short-circuiting device comprising a fixed support carrying contacts, a member having a hub supported by and spaced from said fixed support, an annular contact member slidably mounted on said hub, and weighted arms pivoted to said hub member and associated with said annular member whereby upon a certain predetermined condition the annular member may be actuated for short-circuiting the contacts carried by said fixed support.

2. In combination, a support, a contact mounted thereon, a supporting member spaced from and supported by said first support, a contact member movable into and out of engagement with said fixed contact and guided in its movement by said supporting member, weighted means pivoted to said supporting member and connected to said contact member, whereby movement of said weighted means under certain conditions actuates said contact member.

3. In combination, a support, a plurality of contacts mounted thereon, a member supported by and spaced from said support, a contact member mounted to move relatively to said first member and guided thereby, a plurality of centrifugally-acting, weighted means having an equalizing connection therebetween, said centrifugally-acting means being mounted on said contact guiding member and connected to said contact member, whereby said contact member is actuated by said centrifugally-acting means under certain conditions.

4. In combination, a supporting member, a plurality of contacts mounted thereon, a second supporting member supported from said first supporting member, a contact member movable into and out of engagement with the contacts mounted on said first supporting member, and means on said second supporting member for guiding said contact member in its movement.

In testimony whereof I affix my signature, in the presence of two witnesses.

ARTHUR J. BROWN.

Witnesses:
H. C. CASE,
CHAS. L. BYRON.